United States Patent
Kirisken

(10) Patent No.: US 11,916,416 B2
(45) Date of Patent: Feb. 27, 2024

(54) COVER, MOBILE DEVICE AND ENERGY MANAGEMENT METHOD

(71) Applicant: Vestel Elektronik Sanayi ve Ticaret A.S., Manisa (TR)

(72) Inventor: Barbaros Kirisken, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 1168 days.

(21) Appl. No.: 16/089,247

(22) PCT Filed: Apr. 4, 2017

(86) PCT No.: PCT/EP2017/058038
§ 371 (c)(1),
(2) Date: Sep. 27, 2018

(87) PCT Pub. No.: WO2017/174613
PCT Pub. Date: Oct. 12, 2017

(65) Prior Publication Data
US 2020/0313465 A1 Oct. 1, 2020

(30) Foreign Application Priority Data
Apr. 6, 2016 (EP) ..................................... 16164062

(51) Int. Cl.
*H02J 7/02* (2016.01)
*H02J 7/00* (2006.01)
(Continued)

(52) U.S. Cl.
CPC .......... *H02J 7/0044* (2013.01); *H02J 7/0045* (2013.01); *H02J 7/02* (2013.01); *H02J 50/20* (2016.02); *H02J 50/70* (2016.02)

(58) Field of Classification Search
CPC .. H02J 50/12; H02J 50/80; H02J 50/70; H02J 50/90; H02J 50/60; H02J 50/50;
(Continued)

(56) References Cited

U.S. PATENT DOCUMENTS

2009/0001931 A1  1/2009 Lin
2009/0115666 A1  5/2009 Wulff et al.
(Continued)

FOREIGN PATENT DOCUMENTS

CN   101855738 A   10/2010
EP   2 146 413 A1   1/2010
(Continued)

OTHER PUBLICATIONS

The International Search Report (ISR) with Written Opinion for PCT/EP2017/058038 dated May 31, 2017, pp. 1-14.
(Continued)

*Primary Examiner* — Binh C Tat

(57) ABSTRACT

The present invention provides a cover (201, 220, 230) for removably attaching to a mobile device (101, 117) with an antenna (118), comprising a battery (204), which is configured to provide electrical supply power, an electrical contacting element (205, 206, 211), which is configured to electrically couple the battery (204) to the antenna (118) of the mobile device (101, 117), and a blocking filter (207), which is coupled between the electrical contacting element (205, 206, 211) and the battery (204) and which is configured to block RF signals from the electrical contacting element (205, 206, 211) to the battery (204) and to allow transmission of the electrical supply power between the battery (204) and the electrical contacting element (205, 206, 211). Further, the present invention provides a corresponding mobile device (101, 117) and a corresponding method.

16 Claims, 9 Drawing Sheets

(51) Int. Cl.
*H02J 50/20* (2016.01)
*H02J 50/70* (2016.01)

(58) Field of Classification Search
CPC ...... H02J 50/005; H02J 50/402; H02J 7/0042; H02J 50/10; H02J 7/00; H02J 7/00304; H02J 7/0044; H02J 7/0047; H02J 7/0013; H02J 7/00034; H02J 50/05; H02J 7/00308; H02J 2310/22; H02J 50/20; H02J 7/00045; H02J 7/00309; H02J 50/502; H02J 7/00036; H02J 7/0029; H02J 7/35; H02J 50/40; H02J 2310/48; H02J 7/00302; H02J 2310/40; H02J 13/00022; H02J 13/00032; H02J 3/322; H02J 7/0048; H02J 7/342; H02J 2207/40; H02J 2300/22; H02J 2310/23; H02J 50/30; H02J 7/00032; H02J 7/00041; H02J 7/0019; H02J 7/0049; H02J 7/00714; H02J 7/007194; H02J 7/04; H02J 9/005; H02J 7/0045; H02J 7/02; H04B 5/0037; H04B 5/0081; H04B 5/0093; H04B 1/40; H04B 5/0062; H04B 5/0087; H04B 5/0031; H04B 5/0075; H03F 2203/7215; H03F 2203/7221; H04L 5/001; H01Q 21/28; H01Q 1/246; H01Q 3/20; H01Q 3/01; H01Q 3/38
USPC .................................................. 320/106–115
See application file for complete search history.

(56) References Cited

U.S. PATENT DOCUMENTS

| 2011/0009057 | A1* | 1/2011 | Saunamaki | H04B 5/0037 455/41.1 |
| 2014/0274231 | A1* | 9/2014 | De Luis | H04W 88/06 455/575.7 |
| 2016/0072337 | A1 | 3/2016 | Chang et al. | |
| 2016/0149290 | A1* | 5/2016 | Park | H01Q 1/243 343/702 |
| 2016/0181857 | A1* | 6/2016 | Konanur | H02J 50/10 320/108 |

FOREIGN PATENT DOCUMENTS

| JP | 2001-307032 | 11/2001 |
| JP | 2010-110195 | 5/2010 |
| JP | 2011-087166 | 4/2011 |
| JP | 2012-060717 | 3/2012 |
| JP | 2014128064 | 7/2014 |
| KR | 20110040622 | 4/2011 |
| WO | 2010/093965 A2 | 8/2010 |
| WO | WO 2013/054386 | 4/2013 |
| WO | 2014/036248 A1 | 3/2014 |

OTHER PUBLICATIONS

The International Preliminary Report on Patentability (IPRP) for PCT/EP2017/058038 dated Jul. 6, 2018, pp. 1-7.

* cited by examiner

COVER, MOBILE DEVICE AND ENERGY MANAGEMENT METHOD

CROSS-REFERENCE TO RELATED APPLICATION

This application is a U.S. national phase of International Application No. PCT/EP2017/058038, filed Apr. 4, 2017, which claims priority to European Patent Application No. 16164062.8, filed Apr. 6, 2016, both of which are incorporated by reference herein in their entirety.

TECHNICAL FIELD

The invention relates to a cover for removably attaching to a mobile device. Furthermore, the invention relates to a mobile device and an energy management method.

BACKGROUND

Although applicable to any mobile system that is battery powered, the present invention will be mainly described in conjunction with mobile phones.

Modern mobile phones comprise high power processors, which require a high amount of electrical power to perform respective processing operations. However, in mobile devices the amount of electrical energy, which can be consumed, is limited by the battery. The size of the battery on the other hand is limited by the size of the mobile device. It is understood, that the size and weight of a mobile device are limited. Therefore, the size of the battery and the amount of electrical power the battery can provide are also limited.

To extend the battery life of mobile phones battery covers have been provided, which use a power connector of the mobile phone to connect an additional battery to the mobile phone and carry the battery on the back of the mobile device. These covers are connected to the same connector as any normal charger.

Extending the thickness of the mobile device is not a problem. Nevertheless, the power connectors usually reside at the lower end of the mobile phone. Therefore, the battery cover increases the size of the mobile phone on the side, which carries the power connector. This may be a problem, e.g. if a user carries the mobile phone in a pocket of a shirt and the pocket is too small for the increased size of the mobile phone with the additional battery cover.

Accordingly, there is a need for an improved method of providing additional electrical power to a mobile phone.

SUMMARY OF THE INVENTION

The present invention provides a cover with the features of claim 1, a mobile device with the features of claim 7, and a method with the features of claim 13.

A cover for removably attaching to a mobile device with an antenna, comprises a battery, which is configured to provide electrical supply power, an electrical contacting element, which is configured to electrically couple the battery to the antenna of the mobile device, e.g. to an antenna element, which is provided on the outside of the mobile device, and a blocking filter, which is coupled between the electrical contacting element and the battery and which is configured to block RF signals from the electrical contacting element to the battery and to allow transmission of the electrical supply power between the battery and the electrical contacting element.

A mobile device comprises a housing, an antenna, which is provided on the housing, a radio frequency circuitry, which is configured to emit and receive RF signals via the antenna, and a filter, which is configured to block dc power received via the antenna from entering the RF circuitry and to allow transmission of the dc power between the antenna and energy consuming elements of the mobile device.

An energy management method for a mobile device, comprising the steps of providing electrical supply power from a battery of a removable cover to the mobile device via an antenna of the mobile device, and filtering signals with a low pass filter at the antenna of the mobile device to block dc power received via the antenna from entering RF circuitry of the mobile device and to allow transmission of the dc power between the antenna and energy consuming elements of the mobile device and/or in the cover to block RF signals from the battery and to allow transmission of the electrical supply power between the battery and the antenna.

Modern mobile devices comprise an antenna for data transmission. Such an antenna can e.g. be a GSM, UMTS or LTE antenna for communication in cell phone networks. Further, such an antenna can e.g. be a wireless LAN antenna or the like. Mainly for design reasons antennas in modern mobile devices do not extend or protrude from the housing of the mobile device. Instead, the antennas are either provided as internal antennas or they are provided as part of the frame or case of the mobile device, especially if the frame is a conductive metal frame. If the antenna is provided as part of the frame or case of the mobile device, the antenna is accessible from the outside of the mobile device. Such antennas can further provide a number, i.e. one or more, of different antenna elements, which together form the antenna of the mobile device. The different antenna elements can e.g. comprise active emitting and receiving elements and ground elements.

In contrast to known battery covers, the present invention makes use of these externally accessible antenna elements not to transmit any data via the antenna, but to provide electrical power to the mobile device.

In the cover and the mobile device corresponding filters are provided to separate the supply power from the RF signals (radio frequency signals) which are provided by the mobile devices radio frequency circuit or radio stage or which are received via the antenna. The RF signals in the context of this application comprise al signals related to wireless signal transmission, e.g. in GSM, UMTS or LTE or wireless LAN. The supply power in contrast to the RF signals will be in most cases a DC power (direct current). In the cover and the mobile device the respective filters will therefore block any RF signal and only let pass the DC power. However, the supply power supplied from the battery to the mobile device can also be AC power. The respective filters will then be adapted adequately.

The present invention can therefore provide additional power to the mobile device with a very compact additional cover, which is not forced to connect to a power connector of the mobile device and therefore extend the surface of the housing of the mobile device.

Instead, the present invention provides a cover, which provides additional electrical power to a mobile device and at the same time only extends the thickness of the mobile device and not the length and width.

Further embodiments of the present invention are subject of the further subclaims and of the following description, referring to the drawings.

In one embodiment, the cover can comprise a fixation device, which is configured to fix the cover to the mobile device. The fixation device can comprise at least a first fixation element, which is configured to fixate the cover to the mobile device via a first lateral surface of the mobile device, and a second fixation element, which is configured to fixate the cover to the mobile device via a second lateral surface of the mobile device, especially wherein the second lateral surface is opposite to the first lateral surface. Such a fixation device can e.g. comprise clamps or clips, which fix to the mobile device from two sides. The battery can e.g. be held on the back of the mobile device. The clamps or clips can e.g. be very slim plastic or metal parts. Therefore, the cover has a very compact shape.

In one embodiment, the electrical contacting element can comprise a first electrical contact, which is coupled to a positive output of the battery, and which is configured to electrically couple the battery to a first antenna element of the antenna, and a second electrical contact, which is coupled to a negative output of the battery, and which is configured to electrically couple the battery to a second antenna element of the antenna. The first and second antenna elements can e.g. be active antenna elements, which emit or receive RF signals. One of the antenna elements can also be a ground element, which is coupled to the electrical ground of the mobile device. It is to be understood, that the two antenna elements in the mobile device have to be electrically separated to prevent a short circuit. The electrical contacts can e.g. be simple metal strips or leaf springs or the like.

In one embodiment, the first fixation element can comprise the first electrical contact, and the second fixation element can comprise the second electrical contact. If the fixation elements and the electrical contacts are provided integrally, the size of the cover can further be reduced and a very compact cover can be provided.

In one embodiment, the blocking filter can comprise a low pass filter, which is configured to block RF signals and pass DC power from the battery to the antenna or vice versa. A low pass filter is a simple filter, which can effectively block the RF signals from reaching the battery.

In one embodiment, the cover and/or the mobile device can comprise a battery management unit, which is electrically arranged between the battery and the blocking filter, wherein the blocking filter comprises a low frequency band pass filter, which is configured to block RF signals and DC power and pass low frequency signals to or from the battery management unit. The battery management unit can comprise a charge and discharge controller, which controls power transmission from and to the battery. Such a controller supervises e.g. the charging state of the battery and limits the power, which can be extracted from the battery. The controller also controls the charge process of the battery and e.g. limits the current provided to charge the battery. The mobile device will comprise a device battery management unit, which provides the same functionality as the battery management unit in the cover but for the device's battery. The device battery management unit will therefore control the power consumption and charging of the battery in the mobile device. Both battery management units can communicate using low frequency signals. Such signals can e.g. be $I^2C$, SPI or UART signals or any other low data rate and low frequency data signals. It is evident that the low frequency band pass filter will be adapted to pass the respective low frequency data signals from and to the battery management unit. The low frequency band pass filter will therefore provide a clear separation of the dc power, the RF signals and the low frequency signals used to communicate the two battery management units. Just as an example, the low frequency signals can e.g. comprise frequencies of about 10 kHz.

In one embodiment, the device battery management unit is electrically arranged between the blocking filter and the energy consuming elements and energy sources of the mobile device, wherein the filter comprises a low frequency band pass filter, which is configured to block RF signals and DC power and pass low frequency signals to or from the device battery management unit. The device battery management unit can therefore receive and forward electrical power via the antenna of the mobile device with the low pass filter. At the same time the device battery management unit can also provide electrical power to the antenna, e.g. for loading a battery in the external cover. At the same time the device battery management unit can communicate with to controller in the cover via the low frequency band pass filter.

In one embodiment, the device battery management unit can be configured to manage the battery of the mobile device and the battery of a cover according to the present invention. If the device battery management unit can manage two batteries, there is no need for providing a dedicated low frequency communication between the mobile device and a cover according to the present invention. The power for charging the batteries can e.g. be provided to the mobile device via the device's standard power connector.

In one embodiment, the blocking filter can comprise a high frequency band pass filter, which is configured to block all signals below a predetermined frequency and pass RF signals from the antenna to a radio stage of the mobile device or vice versa The high frequency band pass filter is a third filter element in the mobile device and is used to separate the wireless data transmissions of the mobile device from the low frequency data transmissions of the battery management units and the dc power. The predetermined frequency will therefore be adapted to the operating frequency of the radio stage of the mobile device as needed.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

In the figures like reference signs denote like elements unless stated otherwise.

DETAILED DESCRIPTION OF THE DRAWINGS

Figure 1:
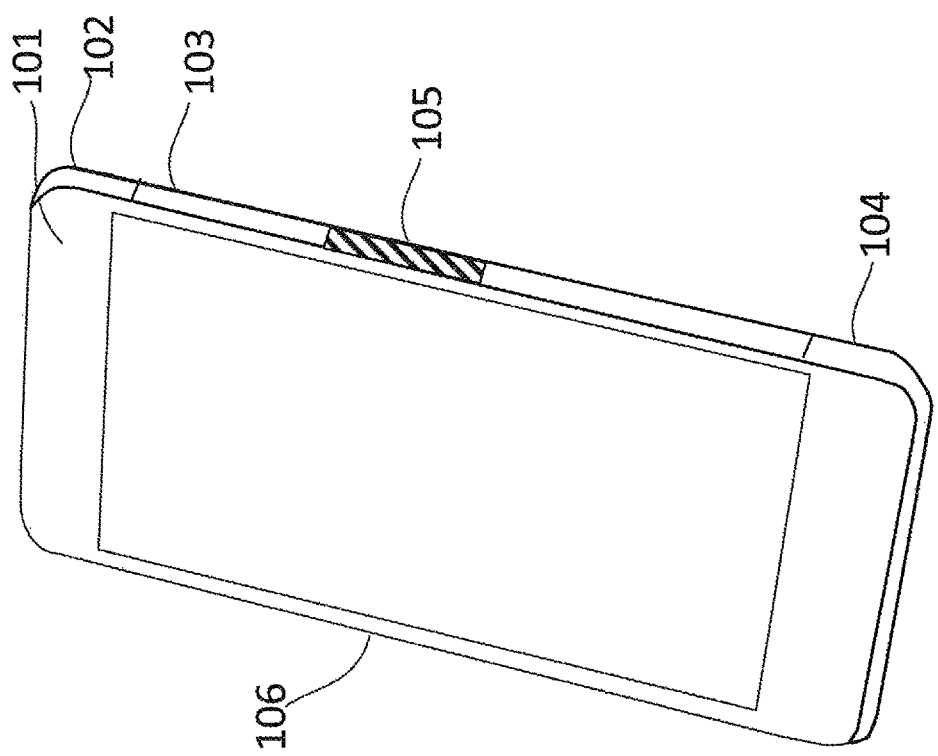
FIG. 1 schematically shows an embodiment of a mobile device according to the present invention.

FIG. 1 schematically shows a mobile device 101. The mobile device 101 has a substantially square surface, which is surrounded by a frame. The frame comprises a plurality of frame elements 102, 103, 104. In case of the mobile device 101 the frame is a metal frame and the frame elements 102, 103, 104 are conductive elements and are electrically isolated from each other.

The frame element 103 further comprises an antenna element 105. A further antenna element 106 is provided on the opposite side of the mobile device 101. In FIG. 1 the antenna elements 105, 106 only cover a section of the frame element 103. It is to be understood that alternatively the complete frame element 103 can be the antenna element 105. This applies to the antenna element 106 as well. The further frame elements 102, 104 can comprise further antenna elements (not explicitly shown) or can e.g. comprise ground connections.

In case that the antenna elements 105, 106 are covered by e.g. a plastic frame (not shown) the plastic frame can e.g. comprise openings for contacting the antenna elements 105, 106.

The mobile device 101 with the metal frame elements 102, 103 and 104 is especially suited to be used with a cover 201 according to the present invention. Nevertheless, any other mobile device 101 with accessible antenna contacts can also be used with a cover 201 according to the present invention.

Figure 2:
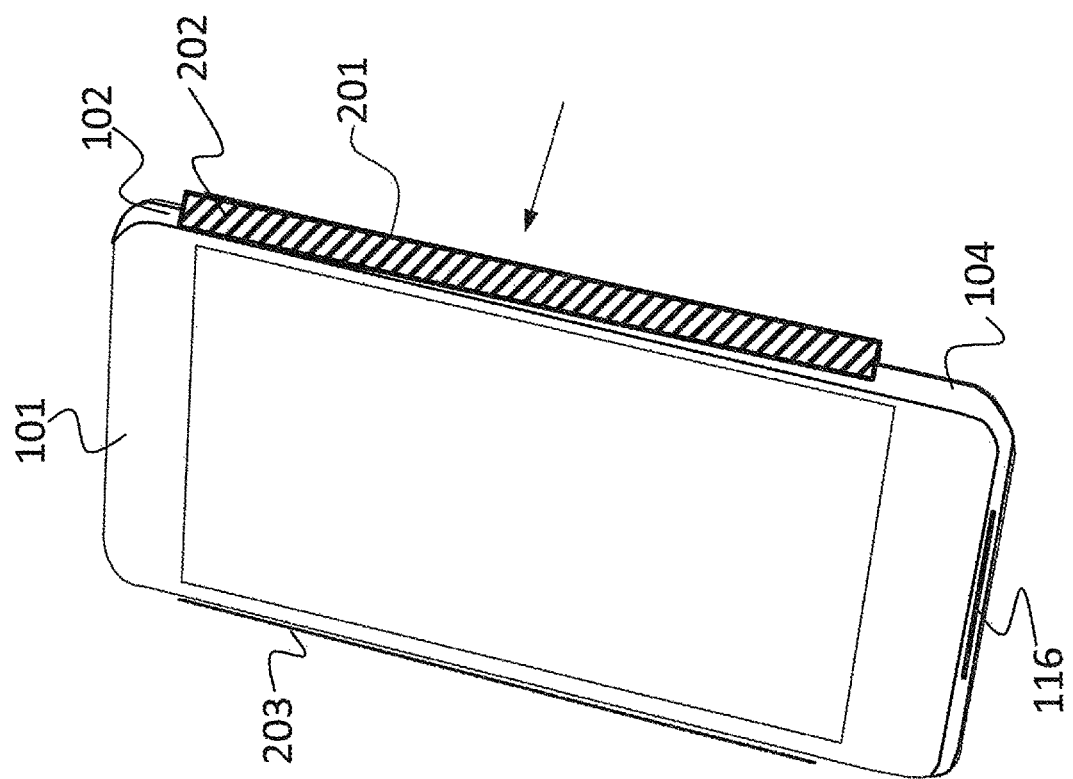
FIG. 2 schematically shows another embodiment of a mobile device according to the present invention with a cover according to the present invention.

FIG. 2 schematically shows another embodiment of the mobile device 101 with a cover 201. The cover 201 is fixed to the mobile device 101 with two fixation elements 202, 203. An arrow shows the direction from which the cover 201 is fixed to the mobile device 101, i.e. from the back.

The fixation elements 202, 203 laterally clamp the cover 201 to the mobile device 101 such that the main part, which contains the battery 204 (see FIG. 3) is positioned on the back of the mobile device 201.

The mobile device 101 comprises a connector 116 on the lower outer side of the frame, i.e. on frame element 104. This connector 116 can e.g. be used to connect the mobile device 101 to a charger (not shown) or to a docking station (not shown) or the like.

It becomes clear that the present invention allows providing an additional battery 204 to the mobile device 101 without blocking the connector 116. Therefore, the connector 116 of the mobile device 101 can be used while the cover 201 is attached to the mobile device 101.

Further, if the connector 116 is used to charge the battery 115 of the mobile device 101, the mobile device 101 at the same time can charge the battery 204 of the cover 201. This will be explained in more detail in connection with FIGS. 6 and 8.

Figure 3:
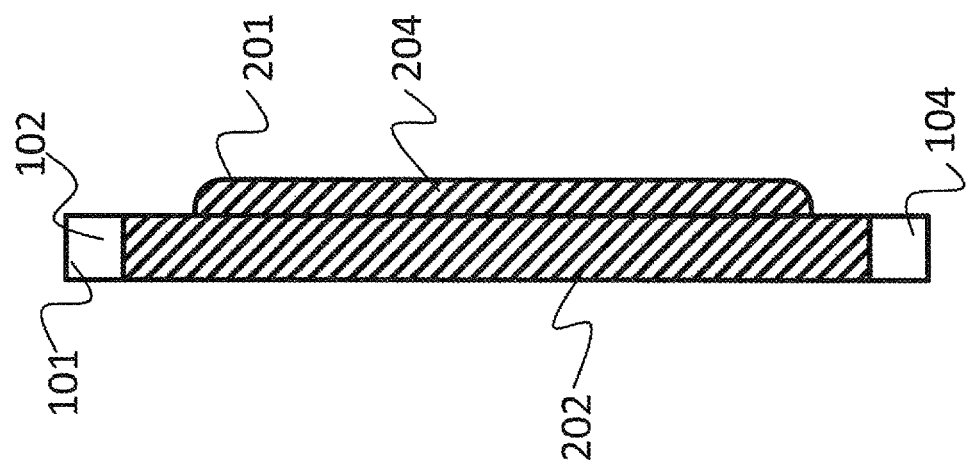
FIG. 3 schematically shows an embodiment of a mobile device according to the present invention with a cover according to the present invention.

FIG. 3 shows the mobile device 101 with the cover 201 in a lateral view. The fixation element 202 covers only part of the lateral side of the mobile device 101. The upper and lower ends of the later side of the mobile device 101 are not covered.

Further, the battery 204 is positioned on the backside of the cover 201, i.e. attached to the back of the mobile device 101.

FIG. 3 demonstrates that the cover 201 with the present invention does not need to cover the lower end of the mobile device 101, where the connector 116 is positioned. Therefore, the cover 201 does not enlarge the mobile device 101 but only increases its thickness.

Figure 4:
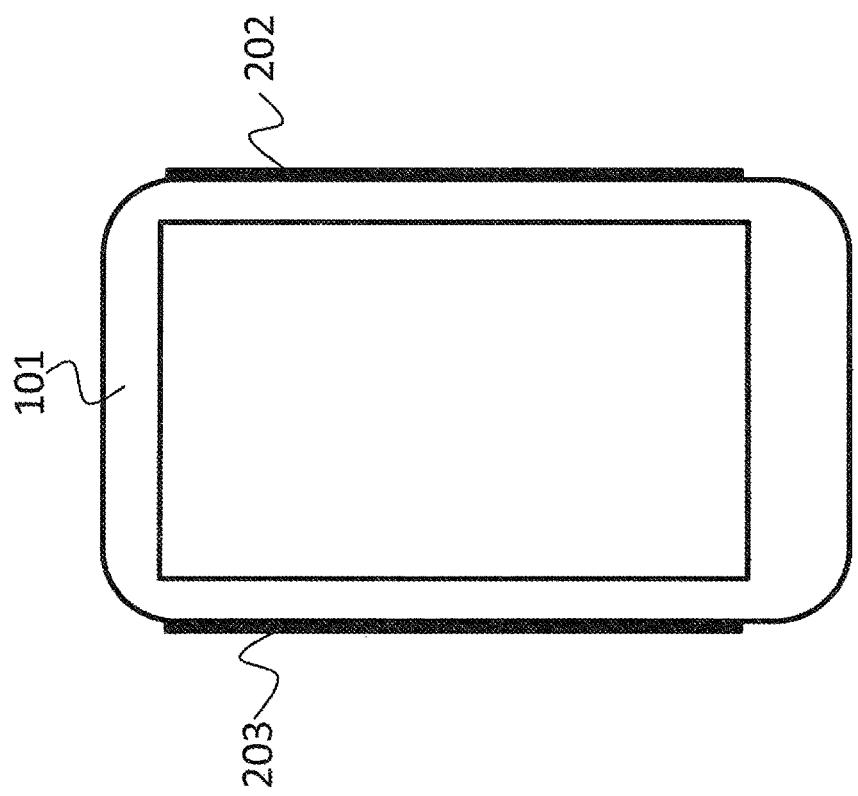
FIG. 4 schematically shows an embodiment of a mobile device according to the present invention with a cover according to the present invention.

FIG. 4 shows the mobile device 101 with the cover 201 in a front view. When viewed from the front, only the fixation elements 202, 203 of the cover 201 protrude on the sides of the mobile device 101.

Figure 5:
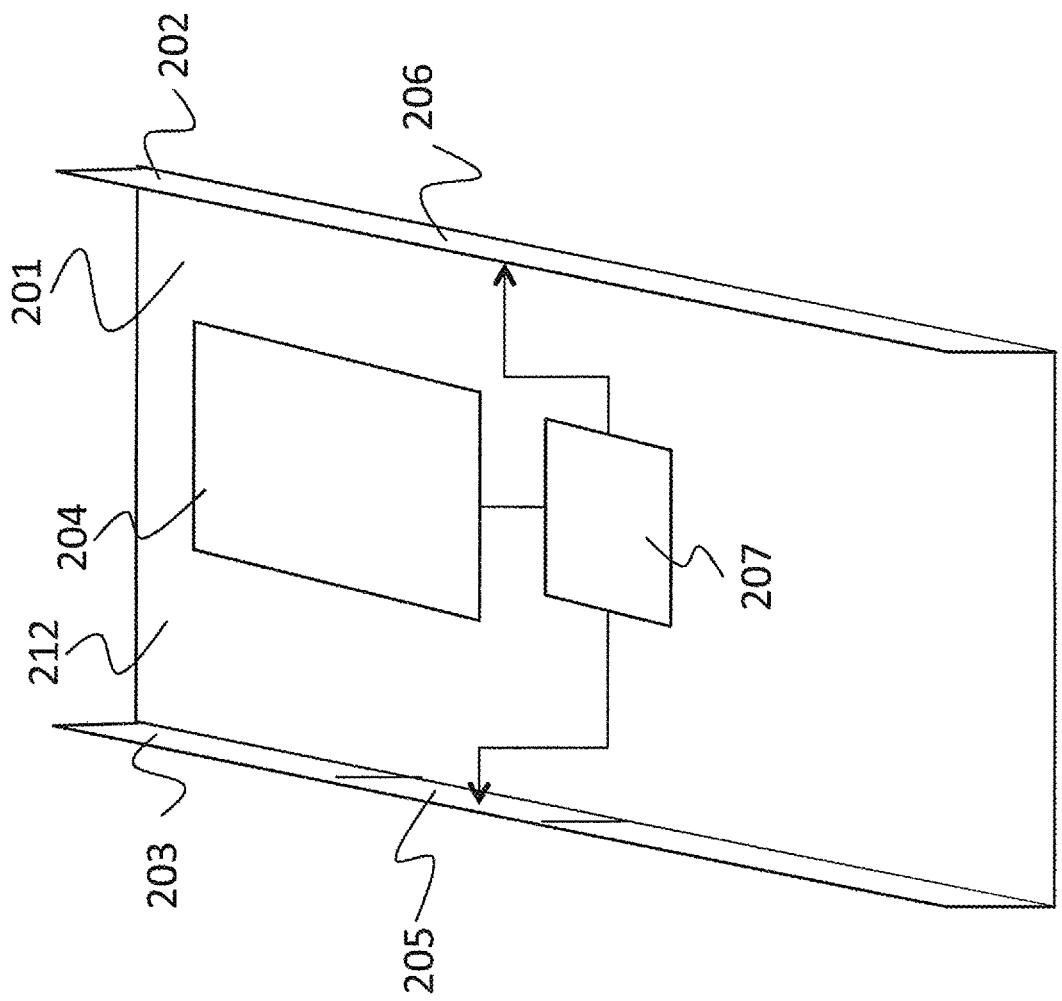
FIG. 5 schematically shows an embodiment of a cover according to the present invention.

FIG. 5 schematically shows the cover 201. The cover 201 is essentially flat shaped, i.e. it comprises a flat shaped back plate 212. The two fixation elements 202, 203 in the form of clips 202, 203 extend perpendicularly from the lateral ends of the back plate 212.

On each one of the clips 202, 203 an electrical contact 205, 206 is provided. The electrical contacts 205, 206 both are oriented towards each other, i.e. to the frame of the mobile device 101, when attached to the mobile device 101. The electrical contacts 205, 206 are provided as metal strips. It is to be understood, that the position of the electrical contacts 205, 206 more or less in the center of the clips 202, 203 is just an example. Naturally, the electrical contacts 205, 206 can be positioned anywhere on the clips 202, 203 if needed by a specific application.

The electrical contacts 205, 206 are both coupled to the blocking filter 207. The blocking filter 207 filters out any RF frequency signals, which might be transmitted to the cover from the antenna elements 105, 106. Such signals can e.g. be any signals captured by the antenna elements 105, 106 or signals, which are generated by the radio frequency circuitry 107 (see FIG. 8) of the mobile device 101.

The blocking filter 207 on the other hand will allow electrical DC power to be transmitted from the battery 204 to the electrical contacts 205, 206. Therefore, the blocking filter 207 allows a dual use of the antenna elements 105, 106. The antenna elements 105, 106 can on the one hand be used for signal transmissions, and on the other hand for conducting electrical DC power, e.g. for supplying the mobile device 101.

It is clear, that the blocking filter 207 can allow bidirectional flow of electrical power. The battery 204 can therefore not only be used to supply the mobile device 101 with electrical power. In addition the battery 204 can be charged from the mobile device 101, while the cover 201 is attached to the mobile device 101.

As already indicated above, the cover 201 does not cover a power connector 116 of the mobile device 101. Therefore, the mobile device 101 can be charged via the power connector 116 and at the same time charge the battery 204.

Figure 6:
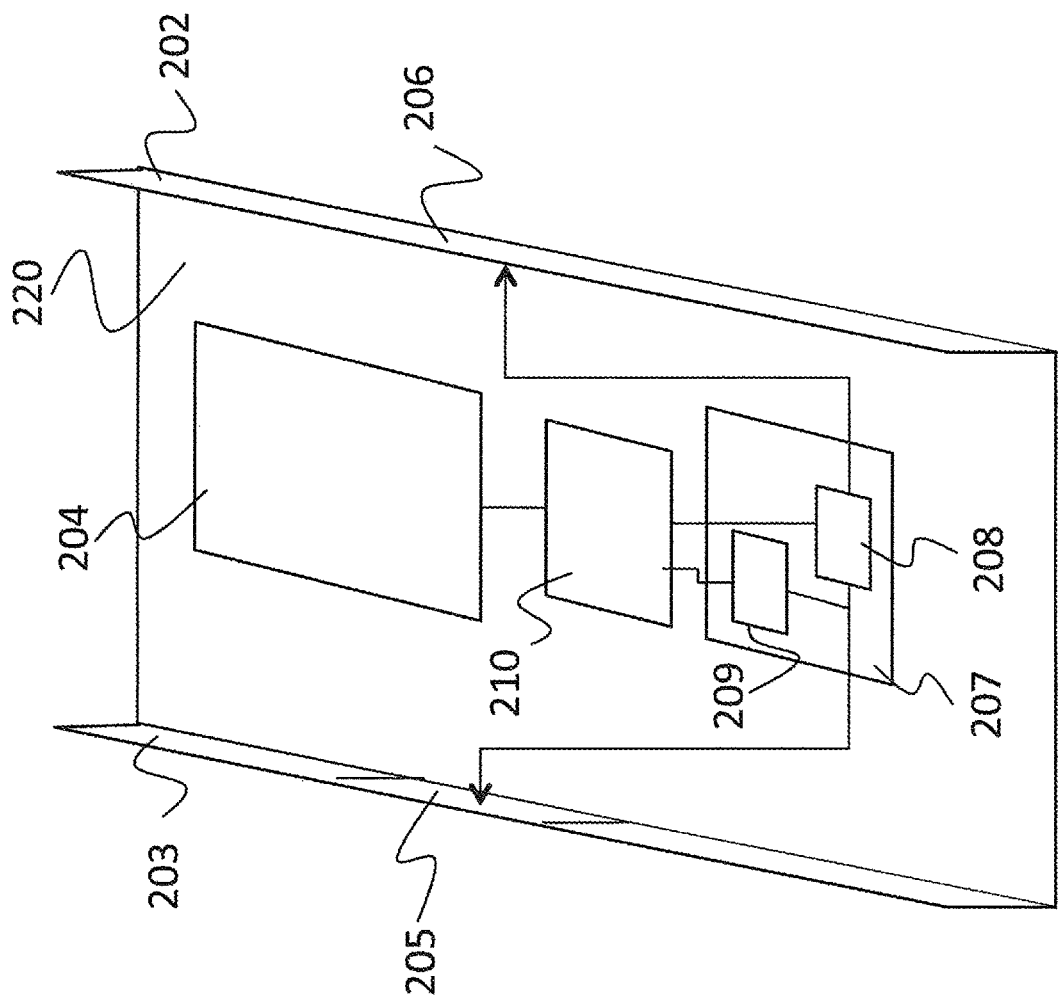
FIG. 6 schematically shows an embodiment of a cover according to the present invention.

FIG. 6 schematically shows another embodiment of a cover 220. The cover 220 is based on the cover 201 and further comprises a battery management unit 210, which is provided between the blocking filter 207 and the battery 204.

The battery management unit 210 is an element, which controls and manages the energy drawing and charging of the battery 204. The battery management unit 210 can therefore e.g. limit the current drawn from the battery 204 or limit the current provided to the battery 204 or the like.

In addition the blocking filter 207 comprises a low pass filter 208 and a low frequency band pass filter 209. The low pass filter 208, as already explained above, serves to block any RF or data signals and only passes the electrical dc power to or from the battery 204.

The low frequency band pass filter 209 in contrast serves to pass to the battery management unit 210 only low frequency signals, e.g. I²C data signals, which the mobile device 101 exchanges with the battery management unit 210. Such signals can e.g. be exchanged between the mobile device 101 and the battery management unit 210 to commonly control the charging or power transmission process between the mobile device 101 and the cover 220.

The arrangement of FIG. 6 therefore, provides power and data transmission between the mobile device 101 and the cover 220.

Figure 7:
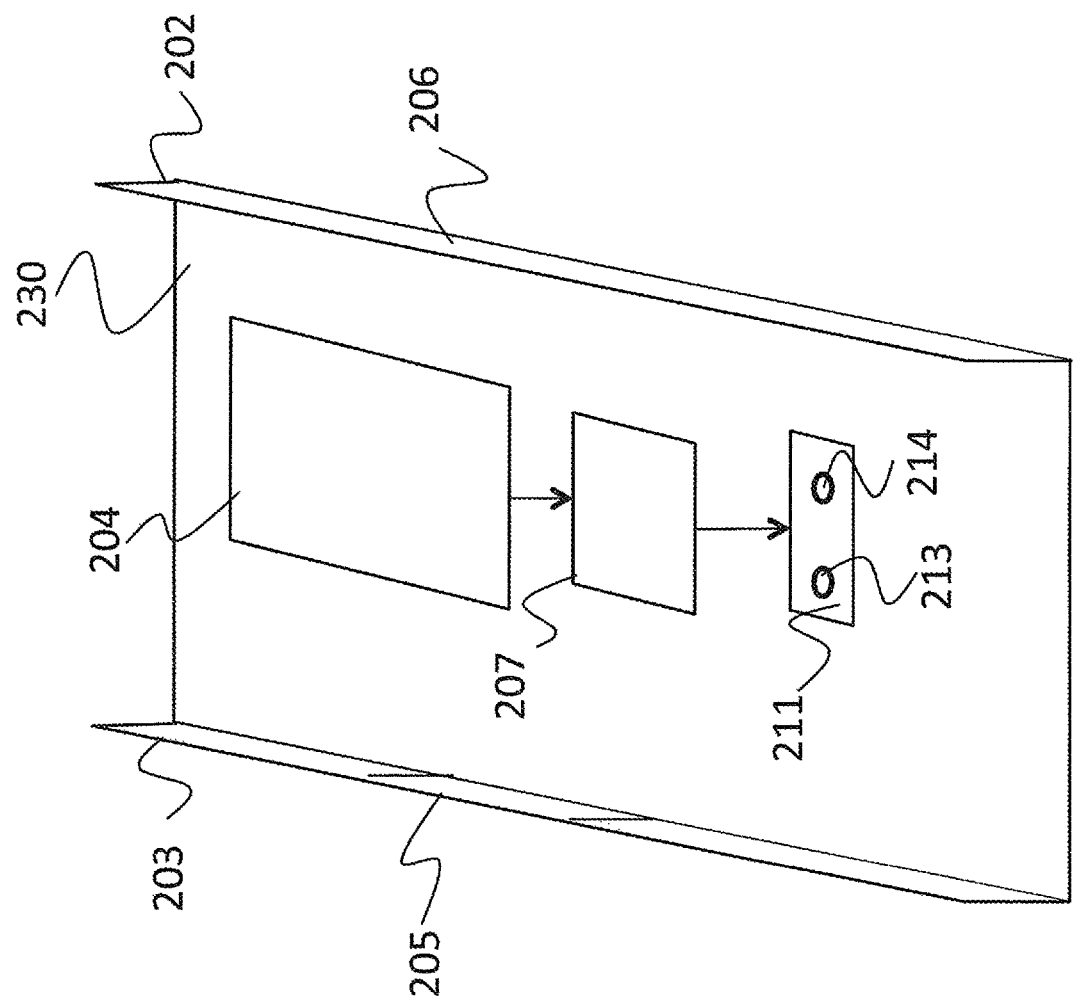
FIG. 7 schematically shows an embodiment of a cover according to the present invention.

FIG. 7 schematically shows another embodiment of a cover 230. The cover 230 is based on the cover 201 and instead of providing electrical contacts 205, 206 provides an electrical contact 211 with two poles 213, 214.

The cover 230 can e.g. be used with mobile devices, which do not provide antenna elements on a frame. Instead, such mobile devices can e.g. provide connection elements on their back cover, which can then be contacted by the electrical contact 211.

It is to be understood, that the single features of the embodiments of the covers 201, 220, and 230 explained above, can be mixed and exchanged as needed by a respective application.

Figure 8:
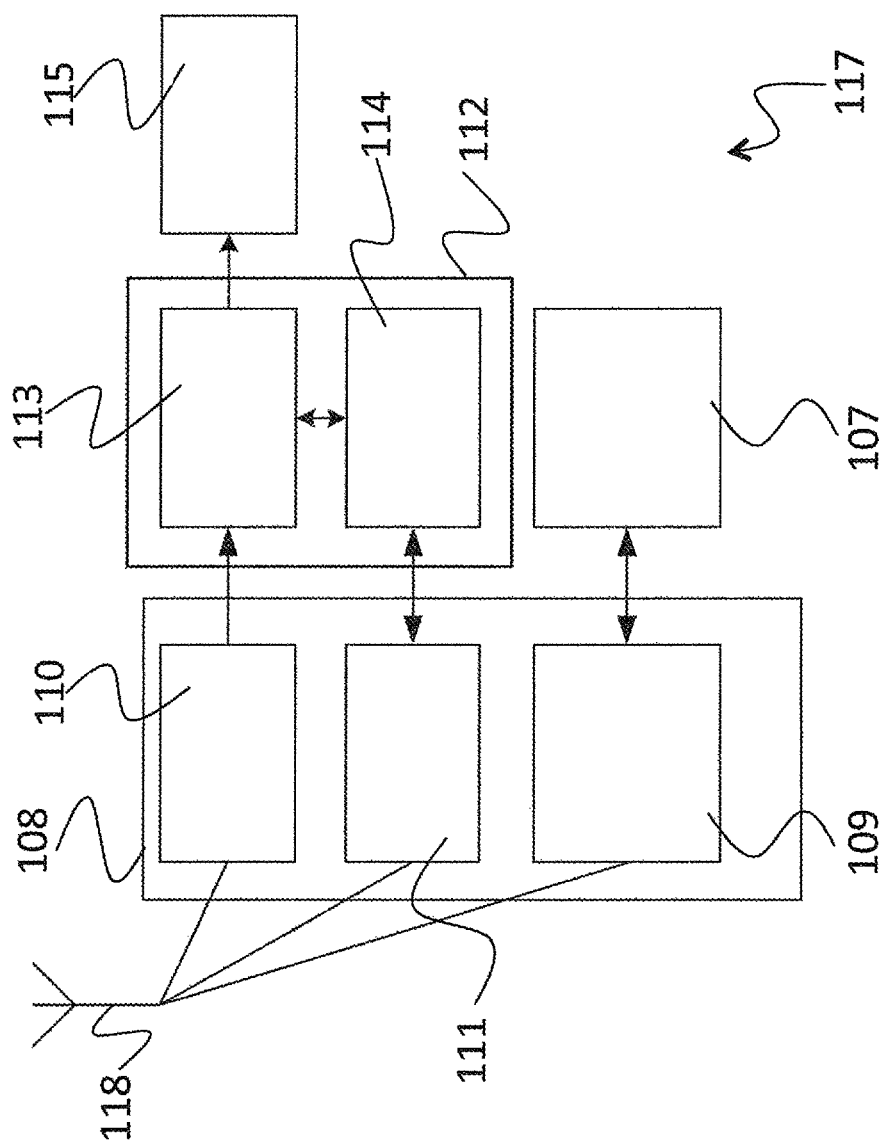
FIG. 8 schematically shows a block diagram of an embodiment of a mobile device according to the present invention.

FIG. 8 schematically shows a block diagram of an embodiment of a mobile device 117.

The mobile device 117 comprises a radio frequency circuitry 107, which provides the communication capabilities of the mobile device 117, and may e.g. support data communication via GSM, UMTS, LTE, Wireless LAN, Bluetooth or the like. Further, the mobile device 117 comprises a device battery management unit 112. The device battery management unit 112 comprises a power controller 113, which controls the power flow and energy levels of the battery 115. In addition a communication controller 114 enables the device battery management unit 112 to communicate e.g. with a battery management unit 210 in a cover 201, 220, 230 via I²C, SPI, UART or any other suitable data transmission system.

The mobile device 117 also comprises a filter 108. The filter 108 comprises a tuned filter element 109, 110, 111 for every one of the above-explained elements.

The filter element 109 is a high frequency band pass filter 109, which is adapted to forward the signals from the antenna 118 to the radio frequency circuitry 107 and vice versa, which are needed for the respective communication. The filter element 110 is a low pass filter 110, which allows DC power to pass from the antenna 118 to the power controller 113 and vice versa. Finally, the filter element 111 is a low frequency band pass filter 111, which allows the communication data of the low frequency communication to pass from the antenna 118 to the communication controller 114 and vice versa.

Although not explicitly explained above, the single filters 108, 207 and filter elements 109-111, and 208, 209 can comprise any electrical element, like e.g. inductors, capacitors, resistances, operational amplifiers or digital filter elements that are needed to provide the respective filter characteristics.

Figure 9:
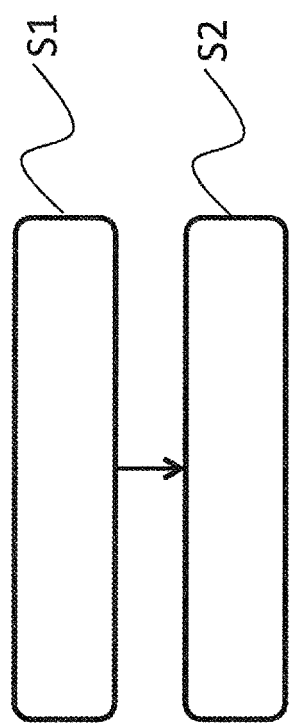
FIG. 9 shows a flow diagram of an embodiment of a method according to the present invention.

FIG. 9 shows a flow diagram of an embodiment of an energy management method for a mobile device 101, 117.

The method comprises providing S1 electrical supply power from a battery 204 of a removable cover 201, 220, 230 to the mobile device 101, 117 via an antenna 118 of the mobile device 101, 117.

Further, any unwanted signals have to be filtered from the supply power. Therefore, the method comprises filtering S2 signals with a low pass filter 110, 208 at the antenna 118 of the mobile device 101, 117 to block dc power received via the antenna 118 from entering the radio frequency circuitry 107. In addition or as an alternative, the method can comprise filtering to allow transmission of the dc power between the antenna 118 and energy consuming elements of the mobile device 101, 117. The filtering can also be performed in the cover 201, 220, 230.

To further allow a low frequency communication between the cover 201, 220, 230 and the mobile device 101, 117 blocking of RF signals and DC power with a low frequency band pass filter 111, 209 in the mobile device 101, 117 and/or the cover 201, 220, 230 can be performed. Further low frequency signals can be passed between the mobile device 101, 117 and the cover 201, 220, 230.

Finally, a high frequency band pass filter 109 in the mobile device 101, 117 can forward RF signals from the antenna 118 to a radio frequency circuitry 107 of the mobile device 101, 117 or vice versa and block all signals below a predetermined frequency.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The present invention provides a cover (201) for removably attaching to a mobile device (101, 117) with an antenna, comprising a battery (204), which is configured to provide electrical supply power, an electrical contacting element (205, 206, 211), which is configured to electrically couple the battery (204) to the antenna of the mobile device (101, 117), and a blocking filter (207), which is coupled between the electrical contacting element (205, 206, 211) and the battery (204) and which is configured to block RF signals from the electrical contacting element (205, 206, 211) to the battery (204) and to allow transmission of the electrical supply power between the battery (204) and the electrical contacting element (205, 206, 211). Further, the present invention provides a corresponding mobile device (101, 117) and a corresponding method.

LIST OF REFERENCE SIGNS 101, 117 mobile device
102, 103, 104 frame elements
105, 106 antenna elements
107 radio frequency circuitry
108 filter
109 high frequency band pass filter
110 low pass filter
111 low frequency band pass filter
112 device battery management unit
113 power controller
114 communication controller
115 battery
116 connector
118 antenna
201, 220, 230 cover
202, 203 fixation element
204 battery 205, 206, 211 electrical contact
207 blocking filter
208 low pass filter
209 low frequency band pass filter
210 battery management unit
212 back plate
213, 214 electrical poles

The invention claimed is:

1. Cover for removably attaching to a mobile device with an antenna, comprising:
   a battery, which is configured to provide electrical supply power,
   an electrical contacting element, which is configured to electrically couple the battery to the antenna of the mobile device, and
   a blocking filter which is coupled between the electrical contacting element and the battery and which is configured to block RF signals from the electrical contacting element to the battery and to allow transmission of the electrical supply power between the battery and the electrical contacting element,
   wherein the electrical contacting element comprises a first electrical contact which is coupled to a positive output of the battery, and which is configured to electrically coupled the battery to a first antenna element of the antenna, and a second electrical contact, which is coupled to a negative output of the battery, and which is configured to electrically couple the battery to a second antenna element of the antenna.

2. Cover according to claim 1, comprising a fixation device, which is configured to fix the cover to the mobile device and which comprises at least a first fixation element, which is configured to fixate the cover to the mobile device via a first lateral surface of the mobile device, and a second fixation element, which is configured to fixate the cover to the mobile device via a second lateral surface of the mobile device, especially wherein the second lateral surface is opposite to the first lateral surface.

3. Cover according to claim 2, wherein the first fixation element comprises the first electrical contact, and wherein the second fixation element comprises the second electrical contact.

4. Cover according to claim 1, wherein the blocking filter comprises a low pass filter, which is configured to block RF signals and pass DC power from the battery to the antenna or vice versa.

5. Cover according to claim 1, comprising a battery management unit, which is electrically arranged between the battery and the blocking filter, wherein the blocking filter comprises a low frequency band pass filter, which is configured to block RF signals and DC power and pass low frequency signals to or from the battery management unit.

6. Mobile device comprising:
   a housing,
   an antenna, which is provided on the housing,
   a radio frequency circuitry, which is configured to emit and receive RF signals via the antenna, and
   a filter, which is configured to block dc power received via the antenna from entering the RF circuitry and to allow transmission of the dc power between the antenna and energy consuming elements of the mobile device,
   wherein the filter comprises a high frequency band pass filter, a low pass filter, and a low frequency band pass filter, and
   wherein the mobile device further comprises a device battery management unit, which is electrically arranged between the filter and the energy consuming elements and energy sources of the mobile device, and wherein the low frequency band pass filter of the filter is configured to block RF signals and DC power and pass low frequency signals to or from the device battery management unit.

7. Mobile device according to claim 6, wherein the housing comprises at least two antenna elements.

8. Mobile device according to claim 6, wherein the filter comprises a low pass filter, which is configured to block RF signals and pass DC power to the energy consuming elements of the mobile device or vice versa.

9. Mobile device according to claim 6, wherein the device battery management unit is configured to manage the battery of the mobile device and the battery of a cover for removably attaching to the mobile device with the antenna, wherein the cover comprises:
   a battery which is configured to provide electrical supply power,
   an electrical contacting element, which is configured to electrically couple the battery to the antenna of the mobile device, and
   a blocking filter, which is coupled between the electrical contacting element and the battery and which is configured to block RF signals from the electrical contacting element to the battery and to allow transmission of the electrical supply power between the battery and the electrical contacting element.

10. Mobile device according to claim 6, wherein the filter comprises a high frequency band pass filter, which is configured to block all signals below a predetermined frequency and pass RF signals from the antenna to a radio frequency circuitry of the mobile device or vice versa.

11. The mobile device according to claim 6, further comprising a cover for removably attaching to the mobile device, comprising:
    a battery, which is configured to provide electrical supply power,
    an electrical contacting element, which is configured to electrically couple the battery to the antenna of the mobile device, and
    a blocking filter, which is coupled between the electrical contacting element and the battery and which is configured to block RF signals from the electrical contacting element to the battery and to allow transmission of the electrical supply power between the battery the electrical contacting element.

12. The mobile device according to claim 11, comprising a fixation device, which is configured to fix the cover to the mobile device and which comprises at least a first fixation element, which is configured to fixate the cover to the mobile device via a first lateral surface of the mobile device, and a second fixation element, which is configured to fixate the cover to the mobile device via a second lateral surface of the mobile device, especially wherein the second lateral surface is opposite to the first lateral surface.

13. The mobile device according to claim 11, wherein the electrical contacting element comprises a first electrical contact which is coupled to a positive output of the battery, and which is configured to electrically couple the battery to a first antenna element of the antenna, and a second electrical contact, which is coupled to a negative output of the battery, and which is configured to electrically couple the battery to a second antenna element of the antenna.

14. The mobile device according to claim 12, wherein the first fixation element comprises the first electrical contact, and wherein the second fixation element comprises the second electrical contact.

15. The mobile device according to claim 11, wherein the blocking filter comprises a low pass filter, which is configured to block RF signals and pass DC power from the battery to the antenna or vice versa.

16. The mobile device according to claim 11, comprising a battery management unit, which is electrically arranged between the battery and the blocking filter, wherein the blocking filter comprises a low frequency band pass filter, which is configured to block RF signals and DC power and pass low frequency signals to or from the battery management unit.

\* \* \* \* \*